US008340636B2

(12) United States Patent
Yin et al.

(10) Patent No.: US 8,340,636 B2
(45) Date of Patent: Dec. 25, 2012

(54) DETERMINING IF AN ACCESS TERMINAL IS AUTHORIZED TO USE AN ACCESS POINT

(75) Inventors: Nanying Yin, Lincoln, MA (US); Pierre A. Humblet, Cambridge, MA (US); Bhumin Pathak, Malden, MA (US); Kamal Dushyanthan, Burlington, MA (US)

(73) Assignee: Airvana LLC, Chelmsford, MA (US)

( * ) Notice: Subject to any disclaimer, the term of this patent is extended or adjusted under 35 U.S.C. 154(b) by 412 days.

(21) Appl. No.: 12/627,285

(22) Filed: Nov. 30, 2009

(65) Prior Publication Data

US 2011/0130116 A1  Jun. 2, 2011

(51) Int. Cl.
*H04M 1/66* (2006.01)
(52) U.S. Cl. .............. 455/411; 455/410; 455/435.1; 455/435.2; 455/552.1; 455/553.1
(58) Field of Classification Search .......... 455/410–411, 455/552.1, 553.1, 435.1, 435.2, 435.3; 713/151; 380/270
See application file for complete search history.

(56) References Cited

U.S. PATENT DOCUMENTS

| 6,711,144 | B1 | 3/2004 | Kim et al. |
|---|---|---|---|
| 6,731,618 | B1 | 5/2004 | Chung et al. |
| 6,741,862 | B2 | 5/2004 | Chung et al. |
| 6,781,999 | B2 | 8/2004 | Eyuboglu et al. |
| 7,170,871 | B2 | 1/2007 | Eyuboglu et al. |
| 7,200,391 | B2 | 4/2007 | Chung et al. |
| 7,242,958 | B2 | 7/2007 | Chung et al. |
| 7,277,446 | B1 | 10/2007 | Abi-Nassif et al. |
| 7,299,278 | B2 | 11/2007 | Ch'ng |
| 7,558,356 | B2 | 7/2009 | Pollman et al. |
| 7,558,588 | B2 | 7/2009 | To et al. |
| 7,603,127 | B2 | 10/2009 | Chung et al. |
| 2002/0118682 | A1* | 8/2002 | Choe ...................... 370/395.31 |
| 2002/0196749 | A1 | 12/2002 | Eyuboglu et al. |
| 2003/0100311 | A1 | 5/2003 | Chung et al. |
| 2005/0213555 | A1 | 9/2005 | Eyuboglu et al. |
| 2005/0243749 | A1 | 11/2005 | Mehrabanzad et al. |
| 2005/0243860 | A1* | 11/2005 | Chen et al. ................. 370/465 |
| 2005/0245279 | A1 | 11/2005 | Mehrabanzad et al. |
| 2006/0067422 | A1 | 3/2006 | Chung |
| 2006/0067451 | A1 | 3/2006 | Pollman et al. |
| 2006/0126509 | A1 | 6/2006 | Abi-Nassif |
| 2006/0159045 | A1 | 7/2006 | Ananthaiyer et al. |
| 2006/0240782 | A1 | 10/2006 | Pollman et al. |
| 2006/0291420 | A1 | 12/2006 | Ng |

(Continued)

FOREIGN PATENT DOCUMENTS

GB  2452688  3/2009

*Primary Examiner* — Kathy Wang-Hurst
(74) *Attorney, Agent, or Firm* — Fish & Richardson P.C.

(57) ABSTRACT

A wireless access point is capable of communicating with an access terminal. The wireless access point executes instructions for receiving a first parameter from the access terminal in an attempt by the access terminal to register with the wireless access point for first service, for using the first parameter to update a failed list if the access terminal is not permitted to register with the wireless access point, for receiving a second parameter from the access terminal in an attempt by the access terminal to register with the wireless access point for second service, and for using the second parameter and the failed list to determine if the access terminal is authorized to use the wireless access point for second service.

27 Claims, 4 Drawing Sheets

U.S. PATENT DOCUMENTS

| | | |
|---|---|---|
| 2006/0294241 A1 | 12/2006 | Cherian et al. |
| 2007/0004455 A1* | 1/2007 | Wennberg et al. ............ 455/558 |
| 2007/0026884 A1 | 2/2007 | Rao |
| 2007/0058628 A1 | 3/2007 | Rao et al. |
| 2007/0077948 A1 | 4/2007 | Sharma et al. |
| 2007/0097916 A1 | 5/2007 | Eyuboglu et al. |
| 2007/0115896 A1 | 5/2007 | To et al. |
| 2007/0140172 A1 | 6/2007 | Garg et al. |
| 2007/0140184 A1 | 6/2007 | Garg et al. |
| 2007/0140185 A1 | 6/2007 | Garg et al. |
| 2007/0140218 A1 | 6/2007 | Nair et al. |
| 2007/0155329 A1 | 7/2007 | Mehrabanzad et al. |
| 2007/0220573 A1 | 9/2007 | Chiussi et al. |
| 2007/0230419 A1 | 10/2007 | Raman et al. |
| 2007/0238442 A1 | 10/2007 | Mate et al. |
| 2007/0238476 A1 | 10/2007 | Raman et al. |
| 2007/0242648 A1 | 10/2007 | Garg et al. |
| 2007/0248042 A1 | 10/2007 | Harikumar et al. |
| 2008/0003988 A1 | 1/2008 | Richardson |
| 2008/0013488 A1 | 1/2008 | Garg et al. |
| 2008/0062925 A1 | 3/2008 | Mate et al. |
| 2008/0065752 A1 | 3/2008 | Ch'ng et al. |
| 2008/0069020 A1 | 3/2008 | Richardson |
| 2008/0069028 A1 | 3/2008 | Richardson |
| 2008/0076398 A1 | 3/2008 | Mate et al. |
| 2008/0117842 A1 | 5/2008 | Rao |
| 2008/0119172 A1 | 5/2008 | Rao et al. |
| 2008/0120417 A1 | 5/2008 | Harikumar et al. |
| 2008/0139203 A1 | 6/2008 | Ng et al. |
| 2008/0146232 A1 | 6/2008 | Knisely |
| 2008/0151843 A1 | 6/2008 | Valmikam et al. |
| 2008/0159236 A1 | 7/2008 | Ch'ng et al. |
| 2008/0162924 A1 | 7/2008 | Chinitz et al. |
| 2008/0162926 A1 | 7/2008 | Xiong et al. |
| 2008/0253550 A1 | 10/2008 | Ch'ng et al. |
| 2008/0254792 A1 | 10/2008 | Ch'ng |
| 2009/0034440 A1 | 2/2009 | Samar et al. |
| 2009/0067447 A1* | 3/2009 | Giaimo et al. ................ 370/431 |
| 2009/0082020 A1 | 3/2009 | Ch'ng et al. |
| 2009/0088155 A1 | 4/2009 | Kim |
| 2009/0116445 A1 | 5/2009 | Samar et al. |
| 2009/0154447 A1 | 6/2009 | Humblet |
| 2009/0156165 A1 | 6/2009 | Raghothaman et al. |
| 2009/0156195 A1 | 6/2009 | Humblet |
| 2009/0156218 A1 | 6/2009 | Garg et al. |
| 2009/0163202 A1* | 6/2009 | Humblet et al. ........... 455/432.1 |
| 2009/0163216 A1 | 6/2009 | Hoang et al. |
| 2009/0163238 A1 | 6/2009 | Rao et al. |
| 2009/0164547 A1 | 6/2009 | Ch'Ng et al. |
| 2009/0168766 A1 | 7/2009 | Eyuboglu et al. |
| 2009/0168788 A1 | 7/2009 | Den et al. |
| 2009/0170440 A1 | 7/2009 | Eyuboglu et al. |
| 2009/0170475 A1 | 7/2009 | Ch'Ng et al. |
| 2009/0170520 A1 | 7/2009 | Jones |
| 2009/0170547 A1 | 7/2009 | Raghothaman et al. |
| 2009/0172169 A1 | 7/2009 | Ch'Ng et al. |
| 2009/0172397 A1 | 7/2009 | Kim |
| 2009/0186626 A1 | 7/2009 | Raghothaman et al. |
| 2009/0262697 A1 | 10/2009 | To et al. |
| 2009/0288145 A1* | 11/2009 | Huber et al. ....................... 726/3 |

* cited by examiner

DETERMINING IF AN ACCESS TERMINAL IS AUTHORIZED TO USE AN ACCESS POINT

TECHNICAL FIELD

This patent application relates generally to determining if an access terminal is authorized to use an access point.

BACKGROUND

Cellular wireless communications systems are designed to serve multiple wireless-enabled devices distributed over a large geographic area by dividing the area into regions called cells or cell areas. Within each cell area, a network-side access device (e.g., an access point) is located to serve client devices, commonly referred to as access terminals (ATs), that are located in the cell area. An AT generally establishes a call, also referred to as a communication session, with a wireless access point to communicate with other entities (e.g., servers) in the network.

Wireless access points may serve smaller areas and have limited access. Access points of this type include private access points, which may serve users in a home or business only. In a private access point, the owner of the access point decides who has access to the wireless access point for communication. Others are blocked from access.

To this end, wireless access points, including private access points, may employ what is referred to as closed access control. Closed access control, in general, means limiting use of an access point in some fashion. In some cases, closed access control may rely on identifiers associated with the mobile device hardware.

In some geographic markets, such as regions of Asia, users are permitted, without consent of their wireless carrier (i.e., operator), to swap User Identity Module (UIM) cards between different mobile devices (or other type of AT). Operators in these markets typically do not store information regarding hardware identifiers for mobile devices. Accordingly, closed access control has to rely on a user identifier, such as an International Mobile Subscriber Identity (IMSI), which is stored in a UIM card.

SUMMARY

Described herein is a method, which is performed on a wireless access point that is capable of communicating with an access terminal, where the access terminal has a hardware identifier, and the access terminal comprises a user-specific card that has a card identifier. The method comprises receiving the card identifier and the hardware identifier from the access terminal in an attempt by the access terminal to register with the wireless access point for service using a first protocol; determining, based on the card identifier, whether the access terminal is authorized to use the wireless access point for service using a second protocol; and if the access terminal is not authorized to use the wireless access point for service using the second protocol, adding the hardware identifier and the card identifier to a failed list (also called a "fail list") that includes devices that are not authorized to use the wireless access point. The method further comprises receiving the hardware identifier again from the access terminal in an attempt by the access terminal to register with the wireless access point for service using a second protocol; and using the hardware identifier that was received again and the failed list to determine if the access terminal is not authorized to use the wireless access point for service using the second protocol.

The foregoing method may include one or more of the following features, either alone or in combination.

Determining if the access terminal is authorized to use the wireless access point for service using the second protocol may comprise determining if the hardware identifier that was received again is on the failed list. The method may further comprise, if the hardware identifier that was received again is on the failed list, redirecting the access terminal to a macro access point; and if the hardware identifier that was received again is not on the failed list, proceeding with registering the access terminal for service using the second protocol via the wireless access point. Entries in the failed list may include corresponding timers, the timers for determining when corresponding entries in the failed list expire. When an entry in the failed list expires, the method may further comprise deleting the entry that has expired. Registering with the wireless access point for service using the first protocol may be part of the 1XRTT protocol; and registering with the wireless access point for service using the second protocol may be part of the EV-DO protocol. If the access terminal is authorized to use the wireless access point for service using the second protocol, the method may further comprise removing, from the failed list, any entry having a hardware identifier that corresponds to the card identifier.

Adding the hardware identifier and the card identifier to the failed list may comprise determining if the card identifier is already in the failed list; if the card identifier is already in the failed list, determining if a hardware identifier in the failed list corresponds to the hardware identifier received from the access terminal; if the hardware identifier in the failed list does not correspond to the hardware identifier received from the access terminal, substituting the hardware identifier received from the access terminal for the hardware identifier already in the failed list; if the card identifier is not already in the failed list, determining if the failed list is full; if the failed list is full, deleting an entry in the failed list and substituting therefor an entry comprised of the card identifier and the hardware identifier; and if the failed list is not full, creating an entry comprised of the card identifier and the hardware identifier, and including the created entry in the failed list.

The wireless access point may be a femtocell, and the access terminal may be a dual-mode wireless service device. The hardware identifier may comprise a hashed value corresponding to a lower-digit hardware identifier on the access terminal.

The foregoing method, and any feature thereof, may be implemented as a computer program product comprised of instructions that are stored on one or more machine-readable storage media, and that are executable on one or more processing devices. The foregoing method, and any feature thereof, may be implemented as an apparatus or system that includes one or more processing devices and memory to store executable instructions to implement the method.

Also described herein is a method, which is performed on a wireless access point that is capable of communicating with an access terminal, where the access terminal has a hardware identifier, and the access terminal comprises a user-specific card that has a card identifier. The method comprises receiving the card identifier from the access terminal in an attempt by the access terminal to register with the wireless access point for service using a first protocol; determining, based on the card identifier, whether the access terminal is authorized to use the wireless access point for service using the first protocol; and if the access terminal is not authorized to use the wireless access point for service using the first protocol, adding the hardware identifier and the card identifier to a failed list that includes devices that are not authorized to use the wireless access point.

The foregoing method may include one or more of the following features, either alone or in combination.

If the access terminal is not authorized to use the wireless access point for service using the first protocol, the method may further comprise determining if the card identifier is in the failed list; and if the card identifier is in the failed list, updating a hardware identifier associated with the card identifier to reflect the hardware identifier of the access terminal. If the card identifier is not in the failed list, the method may further comprise determining if the failed list is full; if the failed list is full, deleting an entry in the failed list and substituting therefor an entry comprised of the card identifier and the hardware identifier; and if the failed list is not full, creating an entry comprised of the card identifier and the hardware identifier, and including the created entry in the failed list.

If the access terminal is not authorized to use the wireless access point for service using the first protocol, the method may further comprise redirecting the access terminal to a macro access point for service. If the access terminal is not authorized to use the wireless access point for service using the first protocol, the method may further comprise disregarding data stored in furtherance of a connection between the access terminal and the wireless access point for service using the first protocol.

The foregoing method, and any feature thereof, may be implemented as a computer program product comprised of instructions that are stored on one or more machine-readable storage media, and that are executable on one or more processing devices. The foregoing method, and any feature thereof, may be implemented as an apparatus or system that includes one or more processing devices and memory to store executable instructions to implement the method.

Also described herein is a method, which is performed by a wireless access point that is capable of communicating with an access terminal. The method comprises receiving a first parameter from the access terminal in an attempt by the access terminal to register with the wireless access point for first service; using the first parameter to update a failed list if the access terminal is not permitted to register with the wireless access point; receiving a second parameter from the access terminal in an attempt by the access terminal to register with the wireless access point for second service; and using the second parameter and the failed list to determine if the access terminal is authorized to use the wireless access point for second service.

The foregoing method may include one or more of the following features, either alone or in combination.

The first parameter may comprise an International Mobile Subscriber Identity number, and the second parameter may comprise a hardware identifier for the access terminal. Registering with the wireless access point for first service may be part of the 1XRTT protocol; and registering with the wireless access point for second service may be part of the EV-DO protocol.

The foregoing method, and any feature thereof, may be implemented as a computer program product comprised of instructions that are stored on one or more machine-readable storage media, and that are executable on one or more processing devices. The foregoing method, and any feature thereof, may be implemented as an apparatus or system that includes one or more processing devices and memory to store executable instructions to implement the method.

Also described herein is a method performed by a wireless access point that is capable of communicating with an access terminal, where the method comprises receiving a parameter from the access terminal in an attempt by the access terminal to register with the wireless access point for first service; checking an authorized user list using the parameter to confirm the access terminal is permitted to register with the wireless access point; and deleting an entry in a failed list that includes a hardware identifier associated with the access terminal, the hardware identifier being different from the first parameter.

The foregoing method may include one or more of the following features, either alone or in combination.

The parameter may comprise a user-specific card identifier. The parameter may be received during attempted 1XRTT registration. The access terminal may comprise a mobile device, and the wireless access point may comprise a femtocell.

The foregoing method, and any feature thereof, may be implemented as a computer program product comprised of instructions that are stored on one or more machine-readable storage media, and that are executable on one or more processing devices. The foregoing method, and any feature thereof, may be implemented as an apparatus or system that includes one or more processing devices and memory to store executable instructions to implement the method.

Any two or more features of any of the foregoing methods may be combined.

The details of one or more examples are set forth in the accompanying drawings and the description below. Further features, aspects, and advantages will be apparent from the description, drawings, and the claims.

DETAILED DESCRIPTION

Cellular wireless communications systems are designed to serve multiple wireless-enabled devices distributed over a large geographic area by dividing the area into regions called cells or cell areas. Within (e.g., at the center of) each cell area, a network-side access device (e.g., an access point) is located to serve client devices in the cell area, which are referred to as access terminals (ATs). Examples of ATs include, but are not limited to, wireless-enabled mobile devices, such as cellular telephones, data access card used in laptops, personal digital assistants (PDAs), and/or other user equipment. An AT generally establishes a call, also referred to as a communication session, with an access point to communicate with other entities (e.g., servers) in the network. The communications link between an AT and an access point may be described in terms of separate directional portions. For example, the link from the access point to the AT may be referred to as the forward link (FL), while the link from the AT to the access point may be referred to as the reverse link (RL).

While an AT is in an active communication session with a first access point, the AT may move to within the range of a second access point. The AT may measure the signal strength of the second access point and forward this information to the first access point. If it is beneficial to do so (e.g., a greater signal strength, a wider variety of capabilities, or a financial advantage is associated with the second access point), the first access point may initiate a process for passing the active communication session from the first access point to the second access point. This is referred to as hand-off.

Similarly an idle AT in a coverage area of the first access point may move towards the second access point. As the AT determines that the signal strength of the second access point is stronger than that of the first access point, the AT issues a registration request to the second access point for permission to communicate via the second access point.

Figure 1:
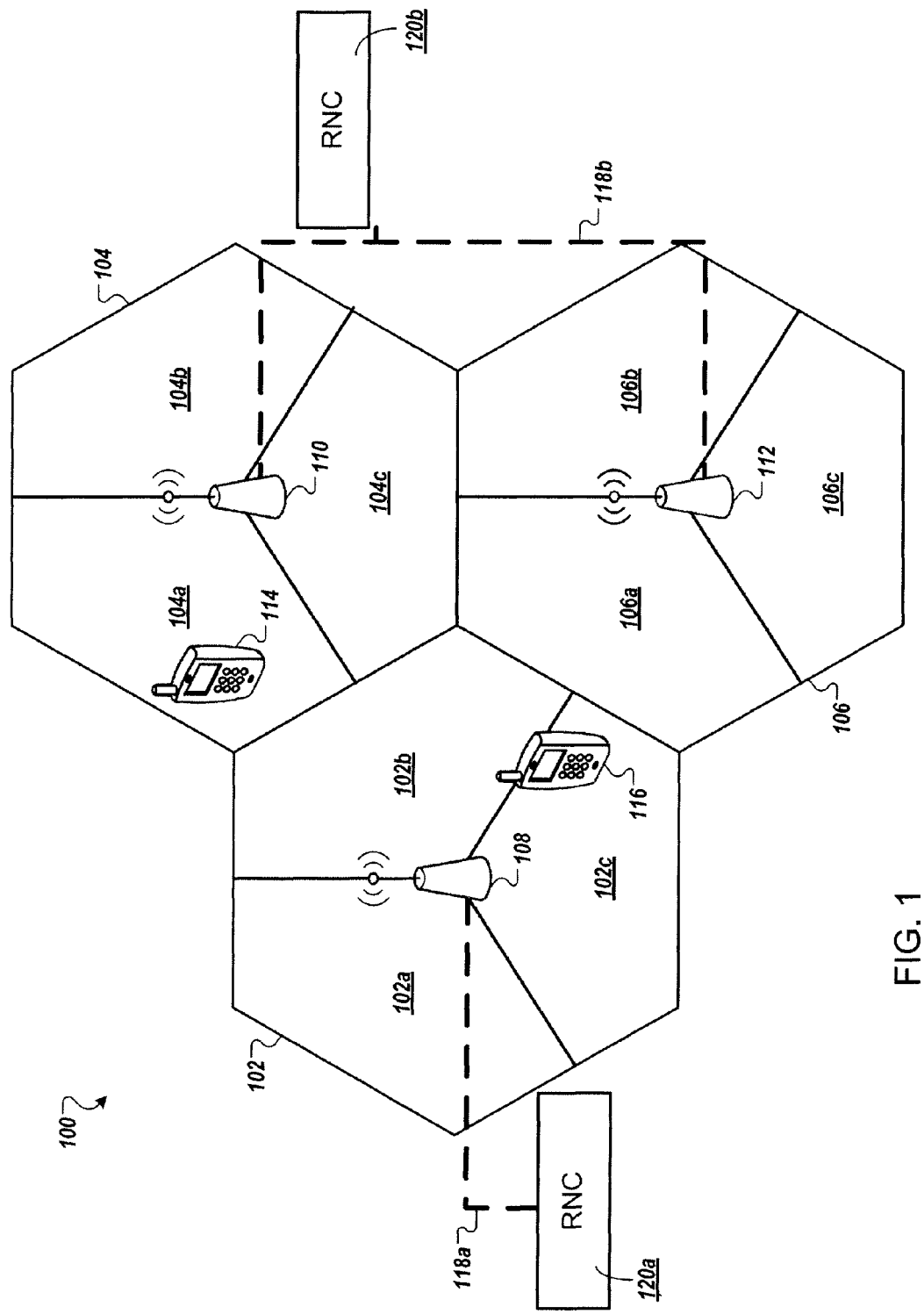
FIG. 1 is a diagram showing a radio access network (RAN).

Referring to FIG. 1, a radio access network (RAN) 100 includes multiple macro access points 108, 110, and 112 located in macrocell areas 102, 104, and 106, respectively. Each macrocell area may be further divided into sectors 102a-c, 104 a-c, 106a-c, respectively, by using multiple sectorized antennas at the macro access points. Macrocell areas 102, 104, and 106 may include one or more private access points (described below). The macro access points 108, 110, and 112 are each configured to communicate with an AT over an airlink. For example, macro access point 108 may communicate with AT 116, while macro access point 110 may communicate with AT 114. Macro access points 108, 110, and 112 are electrically connected over a backhaul connection (e.g., backhaul connection 118a or 118b) to a radio network controller (RNC) which, in turn, communicates with the service provider's core network, e.g., via RNC 120a or 120b, which may be one or more physical devices at different locations.

Figure 2:
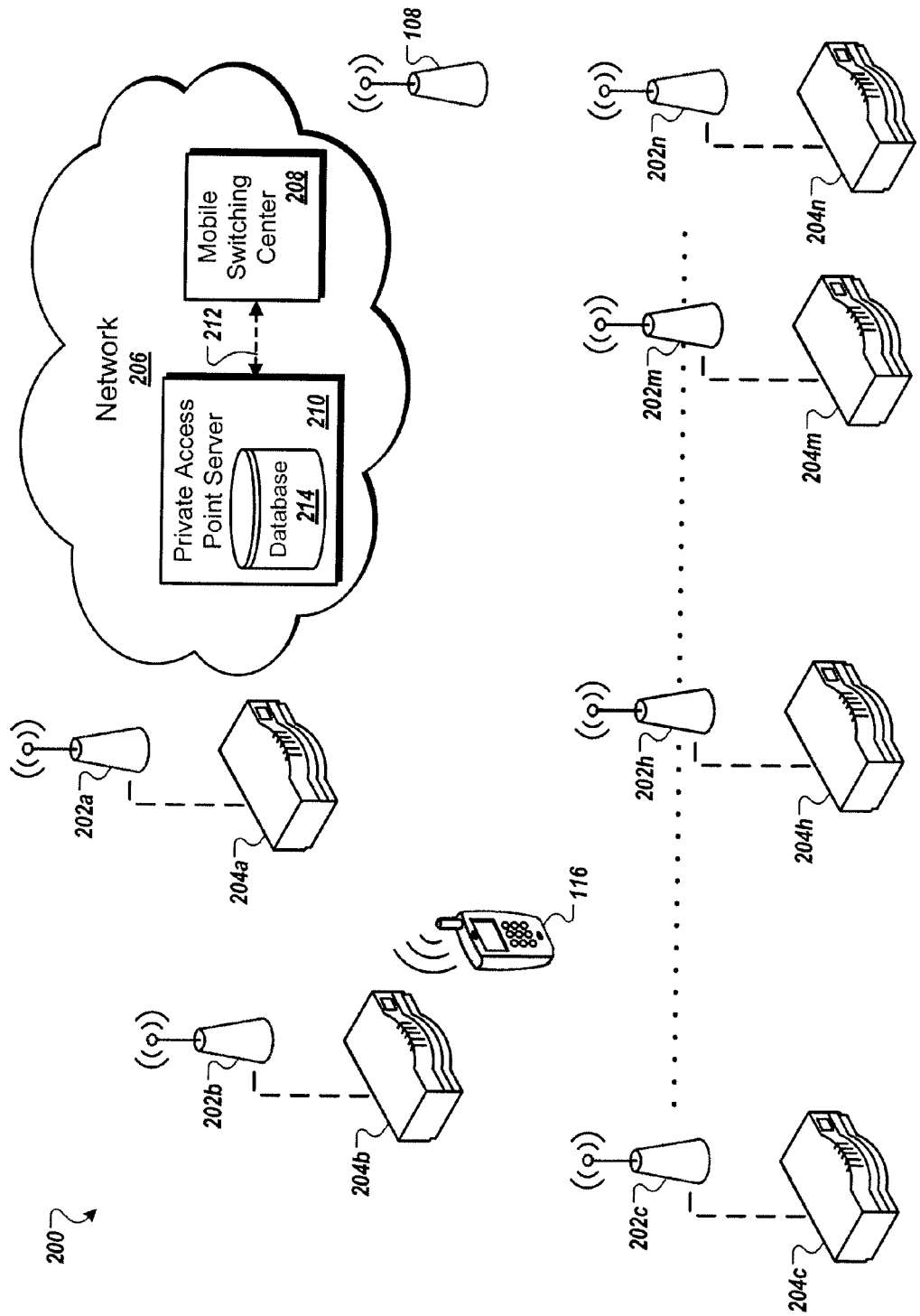
FIG. 2 is a diagram showing a private access point in a RAN

A radio network (i.e., wireless) access point may be deployed in a home, an office, a public space, or a restaurant in a similar manner as a WiFi® access point. This type of wireless access point may be referred to as a private access point. One or more private access points, as shown in FIG. 2, may be deployed within range of a macro access point 108, which is in a wireless communication network 200. For example, private access points 202a-n may be arranged within sector 102c of cell 102 (shown in FIG. 1). There may be any number of private access points within the range of the macro access point 108 (e.g., hundreds, thousands, etc.). Each private access point may be identified, in part, by a code space allocation pseudo-noise code (e.g., PN offset value). Each private access point 202a-n may be connected to an available high-speed internet connection, such as a DSL or cable modem 204a-n, as a backhaul with the RNC/PDSN functionality implemented in each private access point 202a-n. Examples of private access points 202a-n include, but are not limited to, femtocells and picocells. In some examples, a private access point may be integrated into a cable modem or other network hardware, such as a router or WiFi access point.

The RAN 100 shown in FIG. 1, and the wireless communication network 200 shown in FIG. 2, may use both (and, possibly, at the same time) a 1XRTT protocol and an EV-DO protocol for communication among an AT, e.g., ATs 114, 116, a radio network access point, e.g., macro access points 108, 110, 112, and/or private access points 202a-n. Although this description uses terminology from the 1XRTT (1X) and EV-DO air interface standards in CDMA (Code Division Multiple Access) networks, the same concepts are applicable to other communication methods, including, but not limited to, UMTS (Universal Mobile Telecommunications Service), GSM (Global System for Mobile Communications), HSDPA (High Speed Downlink Packet Access), WiMax (Worldwide Interoperability for Microwave Access), WiBro (Wireless Broadband), WiFi, and the like.

As explained above, access points, and particularly private access points, may perform some type of closed access control. For example, not every AT may utilize the services of a particular private access point. In some cases, the owner of a private access point may choose to control which ATs are allowed to utilize the services of that private access point. Individual ATs may be authorized or not authorized (unauthorized) to use the services of the private access point. To this end, the private access point may include an Authorized User List (AUL) for 1X service and another AUL for EV-DO service. These two AULs may be identical, in which case they can be replaced by a single AUL. These AULs may be stored in memory on the private access point or otherwise accessible thereto. Each AUL may be set-up with the wireless carrier, e.g., through a Web-based interface, and sent to the private access point for storage. The AULs for a particular private access point may include information to identify any authorized ATs. For example, the AULs may contain one or more identifiers stored in the AT's User Identity Module (UIM) card, Subscriber Identity Module (SIM) card (for UMTS/GSM), or other type of user-specific card.

ATs that are not identified on the AUL of a particular private access point are not generally authorized to access that private access point. So, a particular AT may be authorized on one private access point and unauthorized on another private access point. Just as a private access point may identify more than one authorized AT in its AUL, an AT may be authorized on more than one private access point.

When an authorized AT (e.g., AT 116) is present within coverage of a private access point (e.g., private access point 202b), the authorized AT may use the private access point rather than a regular cellular radio network access point, such as macro access point 108, to place or receive voice calls and data connections, even if the AT is otherwise within the cell region for the macro access point. If the AT is not authorized for the private access point, the AT will use the macro access point for voice and data communications We sometimes refer to a macro access point as a standard access point or macro BTS to distinguish the macro access point from a private access point. Referring to FIG. 2, macro access point 108 provides direct access to a wider core network 206 (e.g., radio access network). For example, macro access point 108 may provide AT 116 with a communication link to a mobile switching center (MSC) 208 within network 206. MSC 208 may coordinate mobility management for active communication sessions (e.g., voice calls, data transfers, etc.) of AT 116. MSC 208 may also enable AT 116 to establish communication links with other devices and systems (e.g., a Plain Old Telephone System (POTS)) to engage in communication sessions for voice and/or data communications When an idle AT 116 approaches private access point 202b, AT 116 may detect signaling from private access point 202b. AT 116 attempts to register with private access point 202b using separate messages for 1X and EV-DO registrations.

Figure 3:
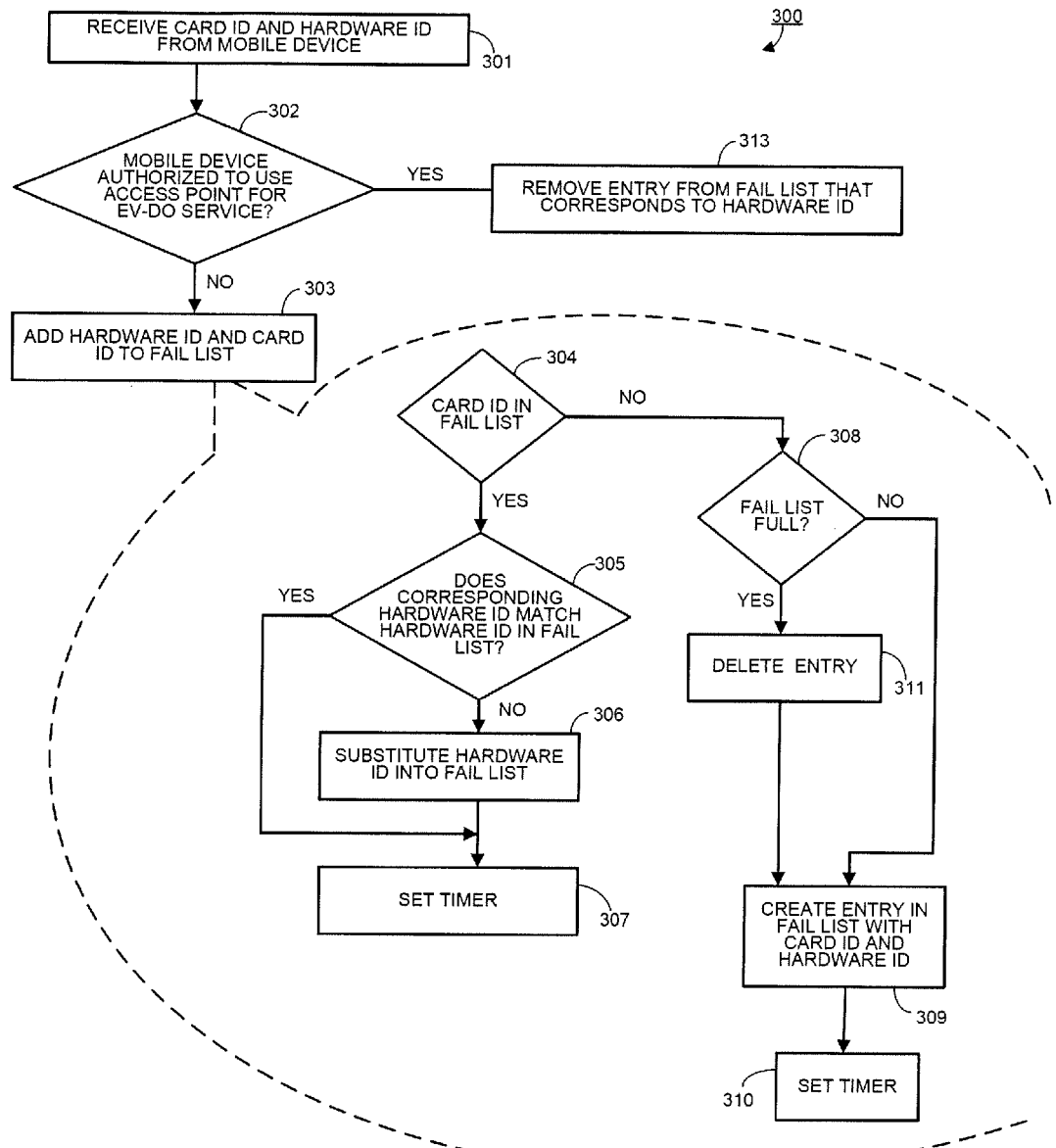
FIG. 3 is a flowchart showing EV-DO closed access control as part of a 1XRTT registration process, which includes generating a failed list that identifies devices that are not authorized on the private access point.
Figure 4:
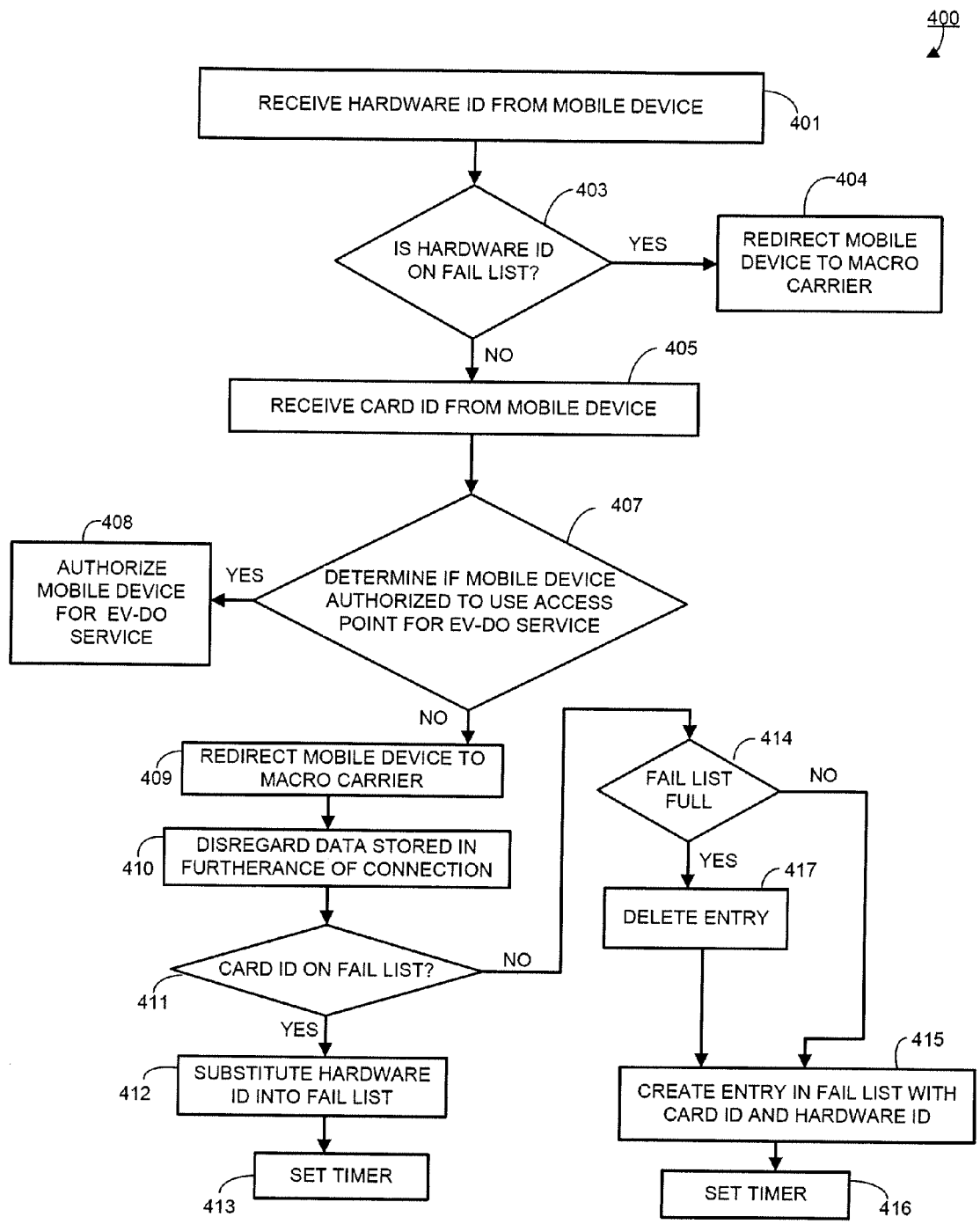
FIG. 4 is a flowchart showing EV-DO closed access control as part of an EV-DO registration process, which includes using the failed list to determine whether a device is authorized on the private access point.

In conjunction with the registration process with private access point 202b, private access point 202b determines whether AT 116 is authorized for 1X service (e.g., communication) and/or EV-DO service (e.g., communication) by checking its 1X and EV-DO AULs, respectively. FIG. 3 shows a process 300 for authorizing AT for EV-DO service during the 1X registration via access point 202b, and FIG. 4 shows a process 400 for authorizing an AT for EV-DO service during the EV-DO registration via access point 202b. In the examples of FIGS. 3 and 4, it is assumed that the AT is a mobile device, such as a cellular telephone, PDA, or data access card in laptop computer. AT 116 is therefore referred to as mobile device 116; however, this is not meant to limit the definition of AT.

Closed access control for the EV-DO registration process with a private access point requires an IMSI number. However the IMSI number is not carried in the EV-DO registration message and is obtained by establishing a service path between the AT and the private access point. The IMSI number is checked against the AUL for EV-DO service. If, at that point, the access point determines, based on the received IMSI number, that the mobile device is not authorized for EV-DO service over the access point, the service path must be torn-down, and data in furtherance of the session disregarded (e.g., deleted). Resources, however, are expended unnecessarily in proceeding with EV-DO registration until the point that the IMSI number is checked. The processes of FIGS. 3 and 4 leverage information, in particular the hardware identifier (e.g., an Electronic Serial Number—ESN), received during both 1X and EV-DO registrations, to discontinue EV-DO registration early in the process. As a result, resources are not wasted in setting-up and tearing down EV-DO service paths unnecessarily.

The processes described herein may be advantageous in Asian markets, where user-specific cards may be swapped-out of mobile devices without notice to the wireless operator (s). This is because the processes assume that the identifier associated with a particular user (e.g., IMSI number), and associated services subscribed to by that user, will remain the same. More specifically, at the outset of 1X registration, the access point receives both an IMSI number and an ESN number (other hardware numbers may be received, as explained below, but the example(s) described herein will use an ESN number). This information can be used to associate a user (via the IMSI number) with a hardware device, even if the user has changed hardware devices since last time the user attempted to communicate via the access point. The information obtained during the 1X registration process may then be used to generate and update a list, referred to herein as a failed list, indicating which users/mobile devices are not authorized to use the access point for EV-DO service via the private access point. This failed list may be used, as described below, to discontinue EV-DO registration near its outset, thereby reducing unnecessary processing by the access point to during attempted EV-DO registration. Because the failed list is updated during 1X registration, chances of improper registrations/denials may be reduced.

Referring to FIG. 3, access point 202b receives (301) a 1X registration request from mobile device 116. The registration request constitutes an attempt by the mobile device to register with, and thereby enable service over, the access point. The registration request contains parameters, including a card identifier (ID), here an IMSI number, and a hardware identifier, here an ESN. It is noted that identifiers other than/in addition to these may be contained in the 1X registration request and/or used in the processes described herein. For example, rather than including an ESN in the registration request, the mobile device may incorporate a pseudo-ESN (pESN) into the registration request. A pESN may be formed in the mobile device by hashing a Mobile Equipment Identifier (MED) for the mobile device. A pESN may be used because the 1X registration process expects a hardware identifier of a particular length. MEIDs are too long and, as a result, may be hashed to produce the fewer digits required for 1X registration.

Access point 202b determines (302), based on the IMSI number, whether the mobile device is authorized to use access point 202b for EV-DO service. For example, access point 202b compares the received IMSI number to IMSI numbers on its EV-DO AUL. Each AUL is typically sent (e.g., pushed-down) to the access point by the wireless operator/cellular service provider who authorizes use of the access point (referred to herein as the operator). In Asian markets, operators typically do not include a hardware identifier, such as the ESN, on the AULs because, as noted above, users in Asia are allowed to change mobile devices, without notifying their operators, simply by removing an UIM card from a mobile device and inserting the card into another mobile device. Consequently, determination of whether the mobile device is permitted to use access point 202b for access is made based on a card identifier, here, the IMSI number.

It is noted that the EV-DO AUL may be updated by a person who owns the access point. For example, a Web-based interface may be provided to allow the user to specify who is/is not allowed to use the access point for service. Such updates may be sent, to the operator, via the Web-based interface. The operator may incorporate those updates into the AUL and send the updated AUL to the access point in real-time or periodically. Moreover, since the AUL contains a user's UIM Card ID, here an IMSI number, switching between mobile devices by a user with one UIM card, requires no change or update in the AUL.

Returning back to FIG. 3, if the mobile device's IMSI number is not on the EV-DO AUL, access point 202b concludes that the mobile device is not authorized to use the access point for EV-DO service. In this case, access point 202b adds (303) an entry for the IMSI number and ESN to a failed list for the access point. As noted, the failed list includes devices that are not authorized to use access point 202b for EV-DO service.

As part of the process of adding entry of the IMSI number and ESN to the failed list, access point 202b determines (304) if the IMSI number is already in the failed list. If the IMSI number is already in the failed list, access point 202b determines (305) if a corresponding ESN in the failed list matches the ESN received from the mobile device. If the ESN already in the failed list is not the same as the ESN received from the mobile device, this is a possible indication that the user has changed mobile devices. Accordingly, the failed list is updated to reflect the user's new ESN for the new mobile device. Specifically, access point 202b substitutes (306) the ESN received from the mobile device for the ESN already in the failed list.

On the other hand, if the corresponding ESN already in the failed list matches the ESN received from the mobile device, this indicates that the user has not changed mobile devices. In this case, no action may be required. However, access point 202b may set (307) (e.g., reset, restart or otherwise change) a timer associated with the received IMSI/ESN entry in the failed list. In this regard, the failed list may include timers (e.g., small computer programs) that keep track of how long an entry has been on the failed list. Those timers may be set, e.g., by the owner of the access point or by the operator, to expire after a period of time, such as 30 minutes, an hour, a day, a week, etc. As a timer expires the associated entry is removed from the failed list. A reason for such timers is to prevent a particular user (IMSI/ENS combination) from using, or repeating attempts to use, an access point for a period of time. Using these timers may limit the size of the failed list and prevent of mobile devices from being on the failed list indefinitely. The timers are programmable, and can be reset by the access point, as in this example. The access point may, or may not, be configured to reset the timers based on a variety of factors.

Referring back to point 304 in FIG. 3, if the IMSI number is not already in the failed list, access point 202b determines (308) if the failed list is full. In this regard, the failed list may be limited in size, e.g., in order to accommodate storage limitations in the access point. If the failed list is not limited in size, or the failed list is not full, access point 202b creates (309) an entry comprised of the received IMSI number and the ESN, and incorporates that entry into the failed list. Access point 202b may also set (310) a timer associated with that new entry in the failed list. If the failed list is at maximum capacity (i.e., it is full), access point may delete (311) one or more predefined entries in the failed list to make room for the received IMSI/ESN combination. For example, access point 202b may be programmed to delete the oldest entry in the failed list (or the one with least remaining time until its timer expires) and creates (309) an entry comprised of the received IMSI number and the ESN. In still other alternatives, information may be associated with entries in the failed list that indicates their importance. An entry that is deemed to be of relatively low importance may be deleted and an entry for the received IMSI/ESN combination created (309). A timer may be set (310) for this new entry, as described above.

Referring back to point 302 in FIG. 3, if the mobile device is authorized to use the access point for EV-DO service, the access point checks the failed list to see if there are any entries that include the hardware identifier, such as the ESN of the mobile device. If any such entries exist, access point 202b removes (313) any such entry from the failed list, including the IMSI number and the ESN.

Failed list entries, which were generated during attempted 1X registration, may be used to make an initial determination about whether the mobile device is, or is not, authorized to use the access point for EV-DO service. In this regard, FIG. 4 shows a process 400 for making such a determination, which may be part of the EV-DO registration process.

In FIG. 4, the access point receives an EV-DO registration request from mobile device 116. In response, the access point requests, and receives (401), the mobile device's hardware identifier, in this example, its ESN. This is the same ESN that was received during the prior 1X registration process for dual-mode devices. The IMSI number is not received until later in the EV-DO registration process, after efforts have been made by the access point to establish an EV-DO service link with the mobile device.

Access point 202b uses the ESN and the failed list to determine if the mobile device is authorized to use the access point for EV-DO service. More specifically, the access point checks the failed list to determine (403) if the received ESN is on the failed list. If the received ESN is on the failed list, that means that the mobile device is not authorized for EV-DO service via the access point. In this case, the access point redirects (404) the mobile device to the macro carrier, e.g., to macro access point 108.

If the ESN is not on the failed list, the access point proceeds with establishment of an EV-DO session, including registering the mobile device for data service via the access point. To this end, the access point participates in exchange of Challenge-Handshake Authentication Protocol (CHAP) messages with the mobile device, and receives (405) the mobile device's IMSI number, embedded in NAI, from a CHAP message (e.g., in the form of IMSI@mycdma.cn). The access point extracts the IMSI number from the CHAP message, and uses the IMSI number for mobile device EV-DO authentication.

The access point determines (407) if the mobile device is authorized to use the access point for EV-DO service. The access point confirms that the IMSI number is authorized by checking the received card identifier, herein an IMSI number, against the access point's EV-DO AUL. If the IMSI number is on the AUL, the access point proceeds with authorizing (408) the mobile device for EV-DO services. The access point removes entries from the failed list with an ESN associated with the IMSI that is in the AUL. That may be the case, e.g., where the mobile device was previously rejected and is now being used by the owner of the private access point.

On the other hand, if the access point determines (407) that the IMSI number is not on the EV-DO AUL, then the mobile device is not authorized for EV-DO service via the access point. In this case, the access point redirects (409) the mobile device to the macro carrier, e.g., to macro access point 108. The access point also disregards (410), e.g., deletes, data stored in furtherance of a connection between the mobile device and the access point. More generally, the access point does this, and whatever other activities are necessary to "clean-up" the EV-DO session for the user of the mobile device.

The access point also determines (411) if the IMSI number received during attempted EV-DO registration is on the failed list. If so, the access point updates the ESN associated with the IMSI number on the failed list to reflect the ESN of the mobile device. Specifically, the access point substitutes (412) the ESN of the mobile device for the ESN already on the failed list. The access point may update/set (413) the timer associated with that entry as well.

On the other hand, if the IMSI number is not already in the failed list, access point 202b determines (414) if the failed list is full. As explained above, the failed list may be limited in size, e.g., in order to accommodate storage limitations in the access point. If the failed list is not limited in size, or the failed list is not full, access point 202b creates (415) an entry comprised of the received IMSI number and the ESN, and incorporates that entry into the failed list. Access point 202b may also set (416) a timer associated with that new entry in the failed list. If the failed list is at maximum capacity (i.e., it is full), access point may delete (417) one or more predefined entries in the failed list to make room for the received IMSI/ESN combination. For example, access point 202b may be programmed to delete the oldest (or any other) entry in the failed list and to create a new entry in the failed list comprising the received IMSI/ESN combination. In still other alternatives, information may be associated with entries in the failed list that indicates their importance. An entry that is deemed to be of relatively low importance may be deleted and an entry for the received IMSI/ESN may be crated in the failed list. One or more timer(s) (416) may be set for this new entry, as described above.

The foregoing is written in the context of the access point (s) and/or mobile device(s) performing operations. It is noted, however, that these hardware devices are controlled by computer programs, which are stored therein on one or more machine-readable storage media, and which are executed by one or more processing devices to perform all or part of the processes described herein attributed to the access point(s) and mobile device(s).

In this regard, the processes described herein can be implemented in a digital electronic circuitry, or in computer hardware, firmware, software, or in combinations of them. The processes can be implemented as a computer program product, i.e., a computer program tangibly embodied in one or more machine-readable storage media, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a service network.

Elements of the processes described herein can be performed by one or more programmable processors executing a computer program to perform functions described herein by operating on input data and generating output. The elements of the processes can also be performed by, and apparatus therefor can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Machine-readable storage media suitable for embodying computer program instructions and data include, but are not limited to, all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The processes described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the system described herein, or any combination of such back-end, middleware, or front-end components. The components of the system can be interconnected by any form or medium of digital data service, e.g., a service network. Examples of service networks include a LAN, a WAN, e.g., the Internet, and include both wired and wireless networks.

The computing system can include clients and servers. A client and server are generally remote from each other and typically interact over a service network. The relationship of client and server arises by virtue of computer programs running on the respective computers and having a client-server relationship to each other.

The processes described herein may be used in the context of any type of closed access control, including idle ATs requesting access to a private access point.

Elements of processes 300 and 400 can be omitted and/or rearranged in a different order to achieve the same, or similar, ends. Such derivative processes are also within the scope of the following claims. In this regard, the processes described herein can be performed in a different order and still achieve desirable results.

Other implementations are also within the scope of the following claims and other claims to which the applicant may be entitled. The foregoing are examples for illustration only and not to limit the alternatives in any way.

What is claimed is:

1. A method, performed on a wireless access point that is configured to communicate with an access terminal at least some of the time, the access terminal having a hardware identifier, and the access terminal comprising a user-specific card that has a card identifier, the method comprising:
    receiving the card identifier and the hardware identifier from the access terminal as part of an attempt by the access terminal to register for service with the wireless access point using a first protocol;
    adding the card identifier and the hardware identifier to a failed list, the failed list indicating that the access terminal is not authorized to communicate with the wireless access point using a second protocol that is different from the first protocol;
    receiving the hardware identifier from the access terminal as part of an attempt by the access terminal to register for service with the wireless access point using the second protocol, wherein a process for registering for service with the wireless access point using the second protocol comprises establishing one or more service paths;
    determining whether the hardware identifier is on the failed list; and
    if the hardware identifier is on the failed list, discontinuing the process for registering for service with the wireless access point using the second protocol before establishing the one or more service paths and before determining, based on the card identifier, whether the access terminal is authorized to communicate with the wireless access point using the second protocol.

2. The method of claim 1, further comprising:
    if the hardware identifier is on the failed list, redirecting the access terminal to a macro access point.

3. The method of claim 1, wherein entries in the failed list include corresponding timers, the timers for determining when corresponding entries in the failed list expire.

4. The method of claim 3, wherein, when an entry in the failed list expires, the method further comprises deleting the entry that has expired.

5. The method of claim 1, wherein the first protocol is the 1XRTT protocol, and wherein the second protocol is the EV-DO protocol.

6. The method of claim 1, wherein, if the access terminal is authorized to communicate with the wireless access point using the second protocol, the method further comprises removing, from the failed list, any entry having a hardware identifier that corresponds to the card identifier.

7. The method of claim 1, wherein adding the hardware identifier and the card identifier to the failed list comprises:
    determining if the card identifier is already in the failed list;
    if the card identifier is already in the failed list:
        determining if a hardware identifier in the failed list corresponds to the hardware identifier received from the access terminal;
        if the hardware identifier in the failed list does not correspond to the hardware identifier received from the access terminal, substituting the hardware identifier received from the access terminal for the hardware identifier already in the failed list;
    if the card identifier is not already in the failed list:
        determining if the failed list is full;
        if the failed list is full, deleting an entry in the failed list and substituting therefor an entry comprised of the card identifier and the hardware identifier; and if the failed list is not full, creating an entry comprised of the card identifier and the hardware identifier, and including the created entry in the failed list.

8. The method of claim 1, wherein the wireless access point is a femtocell, and the access terminal is a dual-mode wireless service device.

9. The method of claim 1, wherein the hardware identifier received at the wireless access point comprises a hashed value corresponding to a lower-digit identifier on the access terminal.

10. One or more non-transitory machine-readable storage media storing instructions that are executable on a wireless access point that is configured to communicate with an access terminal at least part of the time, the access terminal having a hardware identifier, and the access terminal comprising a user-specific card that has a card identifier, the instructions being executable by the wireless access point to perform operations comprising:
receiving the card identifier and the hardware identifier from the access terminal as part of an attempt by the access terminal to register for service with the wireless access point using a first protocol;
adding the card identifier and the hardware identifier to a failed list, the failed list indicating that the access terminal is not authorized to communicate with the wireless access point using a second protocol that is different from the first protocol;
receiving the hardware identifier from the access terminal as part of an attempt by the access terminal to register for service with the wireless access point using the second protocol, wherein a process for registering for service with the wireless access point using the second protocol comprises establishing one or more service paths;
determining whether the hardware identifier is on the failed list; and
if the hardware identifier is on the failed list, discontinuing the process for registering for service with the wireless access point using the second protocol before establishing the one or more service paths and before determining, based on the card identifier, whether the access terminal is authorized to communicate with the wireless access point using the second protocol.

11. The one or more non-transitory machine-readable storage media of claim 10, wherein the operations further comprise:
if the hardware identifier is on the failed list, redirecting the access terminal to a macro access point.

12. The one or more non-transitory machine-readable storage media of claim 10, wherein entries in the failed list include corresponding timers, the timers for determining when corresponding entries in the failed list expire.

13. The one or more non-transitory machine-readable storage media of claim 12, wherein, when an entry in the failed list expires, the operations further comprise deleting the entry that has expired.

14. The one or more non-transitory machine-readable storage media of claim 10, wherein the first protocol is the 1XRTT protocol, and wherein the second protocol is the EV-DO protocol.

15. The one or more non-transitory machine-readable storage media of claim 10, wherein, if the access terminal is authorized to communicate with the wireless access point using the second protocol, the operations further comprise removing, from the failed list, any entry having a hardware identifier that corresponds to the card identifier.

16. The one or more non-transitory machine-readable storage media of claim 10, wherein adding the hardware identifier and the card identifier to the failed list comprises:
determining if the card identifier is already in the failed list;
if the card identifier is already in the failed list:
determining if a hardware identifier in the failed list corresponds to the hardware identifier received from the access terminal;
if the hardware identifier in the failed list does not correspond to the hardware identifier received from the access terminal, substituting the hardware identifier received from the access terminal for the hardware identifier already in the failed list;
if the card identifier is not already in the failed list:
determining if the failed list is full;
if the failed list is full, deleting an entry in the failed list and substituting therefor an entry comprised of the card identifier and the hardware identifier; and
if the failed list is not full, creating an entry comprised of the card identifier and the hardware identifier, and including the created entry in the failed list.

17. The one or more non-transitory machine-readable storage media of claim 10, wherein the wireless access point is a femtocell, and the access terminal is a dual-mode wireless service device.

18. The one or more non-transitory machine-readable storage media of claim 10, wherein the hardware identifier received at the wireless access point comprises a hashed value corresponding to a lower-digit identifier on the access terminal.

19. A wireless access point that is configured to communicate with an access terminal at least part of the time, the access terminal having a hardware identifier, and the access terminal comprising a user-specific card that has a card identifier, the wireless access point comprising:
memory storing instructions that are executable; and
one or more processing devices to execute the instructions to perform operations comprising:
receiving the card identifier and the hardware identifier from the access terminal as part of an attempt by the access terminal to register for service with the wireless access point using a first protocol;
adding the card identifier and the hardware identifier to a failed list, the failed list indicating that the access terminal is not authorized to communicate with the wireless access point using a second protocol that is different from the first protocol;
receiving the hardware identifier from the access terminal as part of an attempt by the access terminal to register for service with the wireless access point using the second protocol, wherein a process for registering for service with the wireless access point using the second protocol comprises establishing one or more service paths;
determining whether the hardware identifier is on the failed list; and
if the hardware identifier is on the failed list, discontinuing the process for registering for service with the wireless access point using the second protocol before establishing the one or more service paths and before determining, based on the card identifier, whether the access terminal is authorized to communicate with the wireless access point using the second protocol.

20. The wireless access point of claim 19, wherein the operations further comprise:
if the hardware identifier is on the failed list, redirecting the access terminal to a macro access point.

21. The wireless access point of claim 19, wherein entries in the failed list include corresponding timers, the timers for determining when corresponding entries in the failed list expire.

22. The wireless access point of claim 21, wherein, when an entry in the failed list expires, the operations further comprise deleting the entry that has expired.

23. The wireless access point of claim 19, wherein the first protocol is the 1XRTT protocol, and wherein the second protocol is the EV-DO protocol.

24. The wireless access point of claim 19, wherein, if the access terminal is authorized to communicate with the wireless access point using the second protocol, the operations further comprise removing, from the failed list, any entry having a hardware identifier that corresponds to the card identifier.

25. The wireless access point of claim 19, wherein adding the hardware identifier and the card identifier to the failed list comprises:
   determining if the card identifier is already in the failed list;
   if the card identifier is already in the failed list:
      determining if a hardware identifier in the failed list corresponds to the hardware identifier received from the access terminal;
      if the hardware identifier in the failed list does not correspond to the hardware identifier received from the access terminal, substituting the hardware identifier received from the access terminal for the hardware identifier already in the failed list;
   if the card identifier is not already in the failed list:
      determining if the failed list is full;
      if the failed list is full, deleting an entry in the failed list and substituting therefor an entry comprised of the card identifier and the hardware identifier; and
      if the failed list is not full, creating an entry comprised of the card identifier and the hardware identifier, and including the created entry in the failed list.

26. The wireless access point of claim 19, wherein the wireless access point is a femtocell, and the access terminal is a dual-mode wireless service device.

27. The wireless access point of claim 19, wherein the hardware identifier received at the wireless access point comprises a hashed value corresponding to a lower-digit identifier on the access terminal.

* * * * *